UNITED STATES PATENT OFFICE.

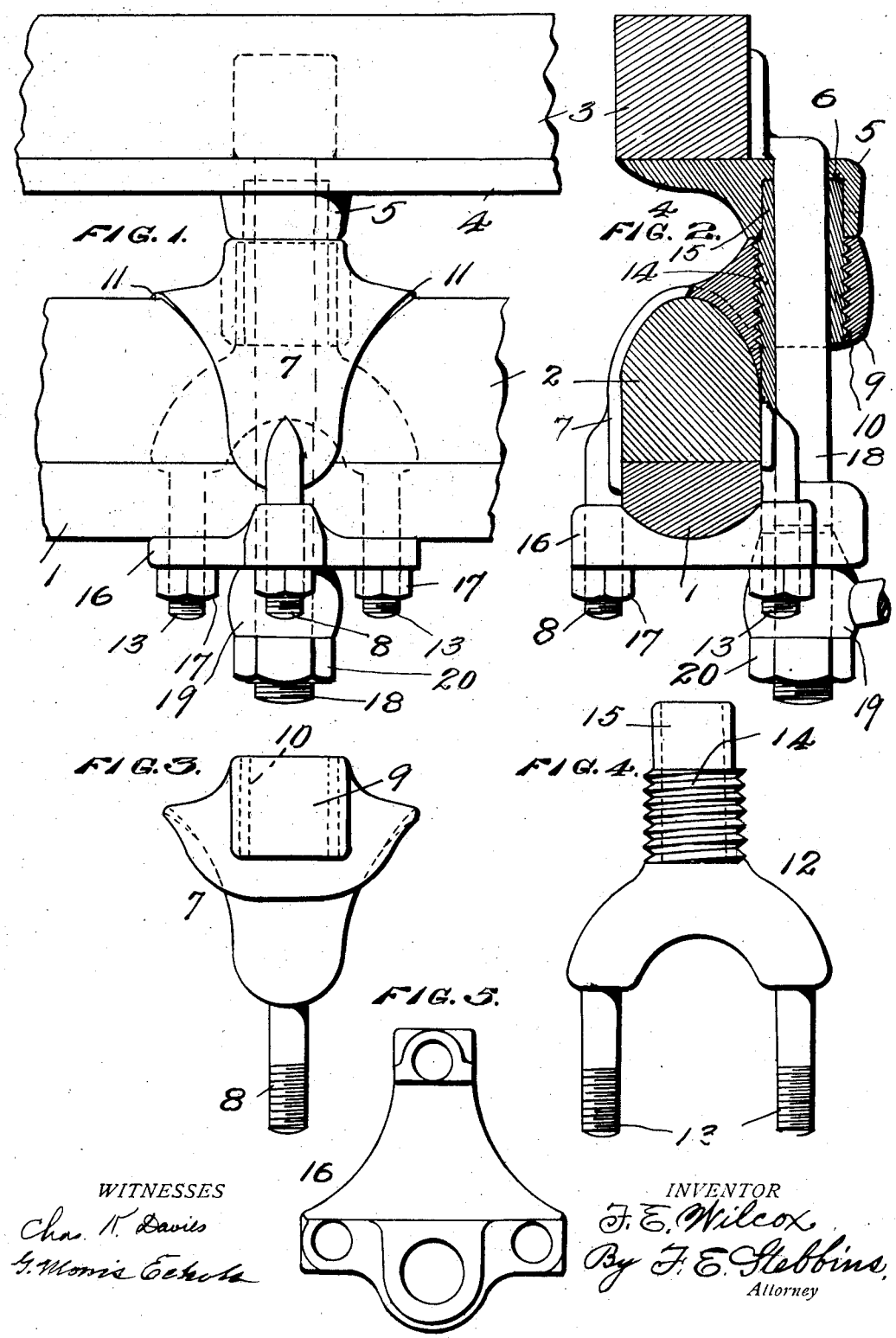

FRANK E. WILCOX, OF MECHANICSBURG, PENNSYLVANIA.

KING-BOLT CLIP AND CONNECTION.

No. 896,603.  Specification of Letters Patent.  Patented Aug. 18, 1908.

Application filed March 24, 1908. Serial No. 423,031.

*To all whom it may concern:*

Be it known that I, FRANK E. WILCOX, a citizen of the United States, residing at Mechanicsburg, in the county of Cumberland and State of Pennsylvania, have invented new and useful Improvements in King-Bolt Clips and Connections, of which the following is a specification.

The object of my invention is the provision, in connection with a vehicle gear, of a king bolt clip which shall have an adjustable head so that it can be raised or lowered relative to the lug upon the head block plate.

In fitting gears to axles and head blocks it is necessary that the head of the king bolt clip shall be properly seated within the recess of the lug at the rear of the head block plate when the fifth wheel members are in frictional contact. In practice, owing to slight variations in the dimensions of the parts, or by reason of other causes, this condition generally cannot be attained without considerable alteration of a part or parts involving labor and annoyance. My invention obviates this common trouble which attends the fitting of the gear in position.

My invention consists in certain novelties of construction and combinations of parts as hereinafter set forth and claimed.

The accompanying drawing illustrates an example of the physical embodiment of the invention constructed according to the best mode I have so far devised for the practical application of the principle.

Figure 1 is a front view of the central portions of an axle and head block with the clip and head block plate in their proper relative positions. Fig. 2 is a vertical section of Fig. 1 on the line of the king bolt. Fig. 3 shows the front part of the clip. Fig. 4 shows the rear part with the head and prongs. Fig. 5 is a top plan view of the axle yoke.

Referring to the several figures, the numeral 1 designates the axle; 2, the axle cap; 3, the head block; 4, the head block plate; 5, a perforated lug at the rear edge of the plate; 6, a recess to receive the head of the clip; 7, the front part of the clip; 8, a threaded prong; 9, a lug having an internally threaded perforation 10, as shown by Fig. 2 in section; 11, 11, flanges which engage the top surface of the axle cap; 12, the rear part of the clip provided with two threaded prongs 13, an exteriorly threaded and perforated cylindrical portion 14 which fits the interior of the perforated and threaded lug 9 of the front part of the clip, and a perforated head 15 as shown; 16, the yoke having holes for the king bolt and prongs of the clip; 17, nuts on the prongs; 18, the king bolt; 19, the perforated brace head; and 20 is a nut at the end of the king bolt.

The pitch and dimensions of the threads by which the two parts of the clip are united may be as desired. Obviously, the head 15 may be raised or lowered relative to the lug 5 at the rear of the head block plate by rotating the rear part 12 of the clip about its longitudinal axis one or more times.

The relative locations of the several parts are clearly shown by the drawing and need not be specified in detail.

What I claim is:

1. A king bolt clip having two parts, one of them provided with a perforated and interiorly threaded lug, and the other with a perforated head and an exteriorly threaded and perforated cylindrical portion.

2. A king bolt clip having a front part with a threaded prong and a perforated lug; a rear part with a perforated head, a perforated cylindrical portion, and two threaded prongs; and means for adjusting the rear part relative to the front part and holding the parts in fixed relative positions.

3. The combination with a vehicle axle, of a clip having a front part and a rear part, said rear part having a head; a head block plate with a lug; and a king bolt; the said rear part of the clip being adjustable relative to the front part of the clip and the lug at the rear of the head block plate.

4. The combination with a head block plate having a perforated lug, of a king bolt clip having a perforated adjustable head.

In testimony whereof I affix my signature in presence of two witnesses.

FRANK E. WILCOX.

Witnesses:
 H. C. BROWN,
 M. E. ANDERSON.